US012131604B2

(12) United States Patent
Neuhauser

(10) Patent No.: US 12,131,604 B2
(45) Date of Patent: Oct. 29, 2024

(54) SYSTEM AND METHOD FOR PROCESSING DOCUMENTS OF VALUE, IN PARTICULAR BANKNOTES

(71) Applicant: GIESECKE+DEVRIENT CURRENCY TECHNOLOGY GMBH, Munich (DE)

(72) Inventor: Richard Neuhauser, Baldham (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 18/550,523

(22) PCT Filed: Mar. 9, 2022

(86) PCT No.: PCT/EP2022/025093

§ 371 (c)(1),
(2) Date: Sep. 14, 2023

(87) PCT Pub. No.: WO2022/194422

PCT Pub. Date: Sep. 22, 2022

(65) Prior Publication Data

US 2024/0169785 A1 May 23, 2024

(30) Foreign Application Priority Data

Mar. 16, 2021 (DE) ..................... 10 2021 001 397.2

(51) Int. Cl.
*G07D 11/18* (2019.01)
*G07D 11/28* (2019.01)
*G07D 11/50* (2019.01)

(52) U.S. Cl.
CPC ............. *G07D 11/18* (2019.01); *G07D 11/28* (2019.01); *G07D 11/50* (2019.01); *G07D 2211/00* (2013.01)

(58) Field of Classification Search
CPC ........ G07D 11/18; G07D 11/28; G07D 11/50; G07D 2211/00; G07D 11/20
See application file for complete search history.

(56) References Cited

U.S. PATENT DOCUMENTS 7,131,593 B2 11/2006 Steinkogler et al.
2004/0211829 A1 10/2004 Steinkogler et al.
(Continued)

FOREIGN PATENT DOCUMENTS

DE 10049435 A1 4/2002
EP 3664050 A1 6/2020

OTHER PUBLICATIONS

International Search Report from corresponding PCT Application No. PCT/EP2022/025093, Jul. 8, 2022.

*Primary Examiner* — Matthew Mikels
(74) *Attorney, Agent, or Firm* — Workman Nydegger

(57) ABSTRACT

A system and to a method for processing documents of value, in particular banknotes, includes: at least one processing device which is designed to process documents of value at a specifiable processing rate and to feed the documents of value to in each case one of at least two banding devices; at least two banding devices which are designed to provide at least one stack, which is formed by the documents of value respectively fed to a banding device, with a band, wherein the banding devices are each characterized by a maximum banding rate which specifies the maximum number of documents of value that can be banded in the respective banding device per unit time; and a control device for specifying the processing rate.

16 Claims, 4 Drawing Sheets

(56) References Cited

U.S. PATENT DOCUMENTS

| | | | | |
|---|---|---|---|---|
| 2009/0229949 | A1 * | 9/2009 | Nakamoto ............ | G07D 9/065 194/302 |
| 2011/0296802 | A1 | 12/2011 | Yano et al. | |

* cited by examiner

SYSTEM AND METHOD FOR PROCESSING DOCUMENTS OF VALUE, IN PARTICULAR BANKNOTES

BACKGROUND

The present invention relates to a system and to a method for processing documents of value, and in particular banknotes.

SUMMARY

When banknotes are processed by machine, they are checked in a banknote processing device and, depending upon the result of the check, sorted by being output into different output or stacker compartments and being stacked in the process. The stacked banknotes are then usually provided with a band. The banding devices used in this case, which are also referred to as banders or banding modules, can only band a certain maximum number of stacks or banknotes per unit time, depending upon their design, which limits the throughput of the total number of banknotes processed, i.e., checked, sorted, and banded, in the processing device per unit time.

It is an object of the invention to provide a system and a method for processing documents of value, and in particular banknotes, with an increased throughput.

This object is achieved by a system and a method according to the independent claims. Preferred embodiments are the subject matter of the dependent claims.

A system for processing documents of value, and in particular banknotes, according to a first aspect of the invention has: at least one processing device which is designed to process, and in particular to separate, to convey, and/or to check, documents of value at a specifiable or specified processing rate (R) and to feed said documents of value—in particular, based upon at least one sorting criterion—to in each case one of at least two banding devices; at least two banding devices which are designed to provide at least one stack, which is formed by the documents of value respectively fed to a banding device, with a band, wherein the banding devices are each characterized by a maximum banding rate (B1max, B2max, . . . ) which specifies the maximum number of documents of value that can be banded in the respective banding device per unit time; and a control device for specifying the processing rate (R) based upon the maximum banding rates (B1max, B2max, . . . ) of the banding devices and ii) at least one frequency parameter (h1, h2, . . . ) which characterizes a statistical frequency which is to be expected and/or assumed—in particular, on the basis of the at least one sorting criterion—and with which the documents of value are distributed among the banding devices.

In a method for processing documents of value, and in particular banknotes, according to a second aspect of the invention, documents of value are processed, and in particular separated, conveyed, and/or checked, in at least one processing device at a specifiable or specified processing rate (R) and fed—in particular, based upon at least one sorting criterion—to in each case one of at least two banding devices. The documents of value fed to the banding devices each form at least one stack which is provided with a band, wherein the banding devices are each characterized by a maximum banding rate (B1max, B2max, . . . ) which specifies the maximum number of documents of value that can be banded in the respective banding device per unit time. The processing rate (R) is specified based upon i) the maximum banding rates (B1max, B2max, . . . ) of the banding devices and ii) at least one frequency parameter (h1, h2, . . . ) which characterizes a statistical frequency which is to be expected and/or assumed—in particular, on the basis of the at least one sorting criterion—and with which the documents of value are distributed among the banding devices.

A computer program product according to a third aspect of the invention comprises instructions which, when the program is executed by a computer, cause the computer to execute the method according to the second aspect of the invention.

A computer-readable storage medium according to a fourth aspect of the invention comprises instructions which, when executed by a computer, cause the computer to carry out the method according to the second aspect of the invention.

Aspects of the invention are preferably based upon the approach of specifying or setting the processing rate at which the documents of value are processed in the processing device, taking into account the maximum banding rates of the banding devices and a statistical distribution of the documents of value to be expected or assumed—in particular, depending upon the sorting criterion—between the output compartments or banding devices.

The respective maximum banding rates (B1max, B2max, . . . ) of the banding devices are specified, for example, in the unit, "documents of value per minute" or "documents of value per second," and are preferably stored in advance in a storage device from which they can be retrieved by the control device. Alternatively or additionally, however, a user interface can also be provided via which the respective maximum banding rates can be entered or specified by a user.

Preferably, the frequency parameters (h1, h2, . . . ) to be expected or assumed for the respective sorting criterion are normalized to 1 or 100% and indicate the expected or assumed statistical frequency in the value range between 0 and 1 or 0% and 100% with which the documents of value are distributed among the respective output compartments or banding devices.

The statistical distribution of the documents of value to be expected or assumed in each case among the output compartments and/or the corresponding frequency parameters can be based, for example, upon empirical values and/or statistical distributions of the documents of value which were obtained during previous processing operations for batches of documents of value that are similar or comparable with regard to the respective sorting criterion (such as fitness or denomination) in the same processing device and/or other processing devices for this sorting criterion.

If, for example, a batch of documents of value is to be sorted with regard to fitness, a frequency parameter (h1) of, for example, 0.7 or 70% can be assumed for the first output compartment, into which documents of value classified as "fit" are output, and a frequency parameter (h2) of, for example, 0.3 or 30% can be assumed for the second output compartment, into which documents of value classified as "unfit" are output, if, in one or more previous processing operations for batches of documents of value that are similar or comparable in terms of fitness, on average 70% of the documents of value were output to the first output compartment ("fit"), and 30% of the documents of value were output to the second output compartment ("unfit").

However, the at least one frequency parameter used in determining or specifying the processing rate of the processing device need not necessarily be based upon a more or less exact statistical evaluation of previous processing operations, but may merely be based upon an assumption of the expected statistical frequency with which the documents of value are likely to be distributed among the output compartments in the batch currently being processed. Such an assumption can be made by an operator, for example, based upon empirical values and/or upon statistical distributions obtained during previous processing operations in the case of fitness sorting.

Alternatively, it is also possible to specify the distribution of the processed banknotes among the output compartments or banding devices, e.g., by controlling the system so that the checked banknotes are fed alternately to a first and second banding device—without taking any sorting criterion into account. Accordingly, in this case, a statistical distribution of the banknotes among the first and second banding devices of 50% each (h1=h2=0.5) is assumed. The assumption or specification of such a statistical distribution is used, for example, in cases where the banknotes to be processed are merely to be counted and/or registered without being sorted in the narrower sense, e.g., by fitness and/or denomination.

Taking into account the statistical frequency distribution to be expected or assumed for a sorting criterion, a processing rate (R) can be specified which is generally higher than the maximum banding rates (B1max, B2max, . . . ) of the respective banding devices. If, for example, the maximum banding rate for both banding devices is the same, and this is 1,000 documents of value per minute, then, taking into account the frequency parameter with the highest value, i.e., in the above-mentioned example 0.7% or 70%, a processing rate is specified which, on the one hand, is higher than the maximum banding rate (1,000 documents of value per minute) yet, on the other, is dimensioned in such a way that the maximum banding rate of the banding device assigned to the relevant output compartment (i.e., in the above-mentioned example, to the first output compartment for documents of value classified as "fit") is not exceeded—optionally including a safety margin or a so-called confidence interval. In the context of the present disclosure, the terms, "safety margin" and "confidence interval," are used as synonyms.

In the above example, for example, a processing rate of 1,200 or 1,300 documents of value per minute can be specified, at which banding must then be performed in the first output compartment at a rate of 1,200×0.7=840 documents of value per minute or 1,300×0.7=910 documents of value per minute (i.e., in each case below the maximum banding rate of 1,000 documents of value per minute), so that a backlog of documents of value is avoided, and continuous processing of the documents of value is ensured. If a processing rate of 1,200 or 1,300 documents of value per minute is specified, a safety margin or confidence interval of (1,000−840)=160 or (1,000−910)=90 documents of value per minute from the maximum banding rate of 1,000 documents of value per minute is thus maintained.

Preferably, the size of this safety margin or confidence interval is selected as a function of the reliability or accuracy of the expected statistical distribution of the documents of value. If the statistical distribution of 70% or 30% assumed in the present example is based upon previous processing of a plurality of batches of documents of value, their reliability or accuracy can be classified as high, such that if a processing rate of 1,200 or 1,300 documents of value per minute is specified, a sufficiently large safety margin from the maximum banding rate is maintained. If, on the other hand, the assumed statistical distribution is based upon a mere assumption or rough estimate, then a correspondingly larger safety margin of (1,000−(1,100×0.7))=230 documents of value per minute can be set by specifying a somewhat lower processing rate of, for example, 1,100 documents of value per minute.

Thus, starting from the maximum banding rate of 1,000 documents of value per minute, an increase in throughput of 10%, 20%, or 30% is achieved by processing documents of value at a specified rate of 1,100, 1,200, or 1,300 documents of value per minute.

Overall, the invention thus increases throughput in the processing of documents of value, and in particular banknotes.

Preferably, the processing rate (R) specified by the control device is greater than the maximum banding rate (B1max, B2max . . . ) of at least one of the banding devices. As a result, an increase in throughput, relative to the maximum banding rate of the relevant banding device, is always achieved. Depending upon the expected or specified distribution of the documents of value among the banding devices, a processing rate even up to a maximum possible processing rate of the system can be specified in this case. The maximum possible processing rate of the system can be given, for example, by a maximum separation rate of a separator provided for separating the documents of value provided in the form of a stack.

In order to avoid a backlog of documents of value in the respective banding devices in the design described above and to ensure continuous operation, provision can preferably be made to detect and/or determine the respective current banding rate which characterizes the number of documents of value banded in at least one of the banding devices per unit time, and to control the system and/or the processing of the documents of value as a function of a deviation of the current banding rate of the relevant banding device from the respective maximum banding rate of this banding device. For example, if an imminent jam of documents of value in one of the banding devices is determined in this way, the system can be controlled so that documents of value which, based upon the at least one sorting criterion, e.g., fitness, should be fed to the relevant banding device, e.g., at the output compartment for documents of value classified as "fit," are instead fed to a stacker device, and in particular an excess stacker or reject stacker. These separately output documents of value can then be fed to the system again, e.g., by insertion into the separator, for processing and sorting.

Preferably, the control device for specifying the processing rate is additionally designed based upon at least one confidence parameter (K) by which a reliability and/or accuracy of the expected statistical frequency with which the documents of value are distributed among the banding devices is characterized. The confidence parameter (K) can, for example, be a factor between 0 and 1 (e.g., 0=no reliability, 1=highest reliability, or also vice versa), which characterizes the relative safety margin. Alternatively, the confidence parameter (K) can also indicate the absolute safety margin—for example, in documents of value per minute. By specifying or selecting the confidence parameter (K), the size of the safety margin between the statistically expected or required banding rate (R×h1 or R×h2) and the maximum banding rate (B1max or B2max) in the respective banding device can be set in a simple and reliable manner.

Alternatively or in addition to the separate output of documents of value described above in case of an imminent jam, however, it is also possible to set an upper limit for the specified processing rate by means of an upper processing rate or reduced processing rate described in more detail below in order to reliably avoid jamming of documents of value in one of the banding devices and to maintain continuous operation during the processing of the documents of value.

Preferably, the processing rate specified by the control device is smaller than at least one upper processing rate (B1max/h1, B2max/h2, . . . ) which in each case corresponds to the quotient obtained from the maximum banding rate (B1max, B2max, . . . ) of one of the banding devices and the frequency parameter (h1, h2, . . . ) which characterizes the expected statistical frequency with which the documents of value are distributed to this banding device. Preferably, the specified processing rate is smaller than all upper processing rates, or the specified processing rate is smaller than the smallest of the calculated upper processing rates. In the example described above with a maximum banding rate of 1,000 documents of value per minute in each case and a statistical frequency of the distribution of the documents of value among the two banding devices of 70% or 30%, the upper processing rate is 1,000/0.7=1,429 and 1,000/0.3=3,333 documents of value per minute. In this example, a processing rate (R) is thus specified which is in any case smaller, and preferably significantly smaller, than 1,429 documents of value per minute. This makes it possible in a simple manner for the banding rate that is statistically expected or required in the respective banding device to always be smaller, and preferably significantly smaller, than the maximum banding rate. As a result, jamming of documents of value in the respective banding devices can be avoided despite an increase in the overall throughput during the processing of the documents of value, thus enabling continuous operation.

Preferably, the control device is designed to specify a processing rate (R) which is at most as large as (i.e., less than or equal to) at least one reduced processing rate which corresponds to the upper processing rate (B1max/h1, B2max/h2) which is reduced based upon the at least one confidence parameter (K). If the confidence parameter (K) is, for example, a factor between 0 and 1 ($0<K<1$), the respective reduced processing rate is calculated as follows: (B1max/h1)×K or (B2max/h2)×K. For the specified processing rate (R), the following then applies: R≤B1max/h1)×K and R≤(B2max/h2)×K. As in the exemplary embodiment described above, in the present preferred design, the specified processing rate is preferably smaller than or equal to the smallest of the upper processing rates which are reduced by means of confidence parameters. If, for example, a value of 0.84 is assumed for the confidence parameter (K), then, in the example described above (maximum banding rate of 1,000 documents of value per minute, statistical frequency 70% or 30%), the reduced upper processing rate that is relevant for specifying the processing rate is (1,000/0.7)×0.84=1,200 documents of value per minute. Depending upon the reliability or accuracy of the statistical frequency assumed or expected in each case for the distribution of the documents of value among the banding devices, the confidence parameter (K) can of course also assume smaller or larger values, such as 0.7, 0.75 or 0.8, or 0.9 or 0.95. As a result, jamming of documents of value in the respective banding devices can be avoided despite an increase in the overall throughput during the processing of the documents of value, thus ensuring continuous operation with particularly high reliability.

Preferably, a user interface can further be provided which is designed to enable a user to specify the at least one sorting criterion and/or the respective maximum banding rate and/or the at least one frequency parameter and/or the at least one confidence parameter. The user interface can have, for example, a keyboard, a touchscreen, and/or selection keys via which the desired value of one or more of the aforementioned parameters can be selected and specified. Alternatively or additionally, however, the user interface can also be designed for inputting the relevant values by means of speech or voice control. The parameters required for determining or specifying the processing rate in each case can thus be input or specified in a simple and fast manner, such that the processing rate can be reliably and quickly adapted to the batch of documents of value to be processed in each case and the statistical distribution of the documents of value among the respective output compartments to be expected depending upon the sorting criterion, in order to ensure the most continuous operation possible during processing.

Alternatively or additionally, a user interface can be provided which is designed to enable a user to change the processing rate specified by the control device. The user interface can have, for example, a keyboard, a touchscreen, and/or selection keys via which the processing rate can be changed, and in particular increased or decreased. In a particularly simple configuration, for example, two keys, "speed up" and "speed down," can be provided, which, when actuated, increase or decrease the initially determined or specified processing rate. Alternatively or additionally, however, the user interface can also be designed to enable the processing rate to be changed by means of voice input or voice control. As a result, the respectively specified processing rate can be further optimized by an operator in order, on the one hand, to achieve an even higher overall throughput and, on the other, to prevent jamming of documents of value in the output compartments or banding devices.

Preferably, at least one memory device is provided in which the maximum banding rates by which the banding devices are characterized are stored. Since the maximum banding rates of the banding device generally do not change or do not change significantly, they can be easily retrieved by the control device from the memory device and taken into account when determining the processing rate without the need for an operator to specify the maximum banding rates. The determination and specification of the processing rate is thus particularly fast and, since errors in the input of the maximum banding rates by an operator can be ruled out, reliable.

Preferably, the control device is designed to detect and/or determine at least one current banding rate (B1 through B4) characterizing the number of documents of value banded in at least one of the banding devices per unit time, and to control the system and/or the processing of the documents of value as a function of a deviation of the current banding rate (B1 through B4) of the relevant banding device from the respective maximum banding rate (B1max or B2max) of this banding device. For example, the deviation (e.g., B1max−B1 or B2max−B2) of the detected current banding rate from the respective maximum banding rate can be compared with a specified safety margin or confidence interval. If the deviation is smaller than the safety margin or the confidence interval, then the specified processing rate can be reduced, for example, in order to reliably prevent jamming of documents of value in one of the banding devices or to continue to reliably ensure continuous processing of the documents of value. If, on the other hand, the deviation is greater than the safety margin or the confidence interval, then the currently specified processing rate is maintained or, if the deviation is relatively large, for example, increased to some extent. This enables continuous processing of the documents of value in a particularly reliable manner, and at the same time a high throughput.

Preferably, the control device is designed, in the event that the deviation of the current banding rate of the relevant banding device from the maximum banding rate of this banding device falls below a specified deviation value and/or decreases over time, i.e., the current banding rate approaches the maximum banding rate, to initiate certain measures in order to reliably maintain continuous operation in the processing of the documents of value and/or to avoid jamming of documents of value in the output compartments or banding devices. For example, in this case, the system is controlled in such a way that documents of value which are to be fed, based upon the at least one sorting criterion, e.g., fitness, to the relevant banding device, e.g., at the output compartment for documents of value classified as "fit," are instead fed to a stacker device, and in particular an excess stacker or reject stacker. Alternatively or additionally, the processing of the documents of value can also be stopped, at least temporarily. In this case, in particular only the separation, checking, and output of the documents of value into the output compartments is stopped, whereas the banding in the relevant banding device is continued in order to prevent imminent jamming of documents of value in the relevant banding device in advance. Alternatively or additionally, it is also possible to specify a processing rate which is reduced compared to the currently specified processing rate and/or to specify a transport speed which is reduced compared to a current transport speed at which the documents of value are conveyed during the current processing—in particular, during or after the separation, checking, and output. Preferably, in this case, too, the banding of the documents of value is continued in the relevant banding device, such that imminent jamming of documents of value in the banding device can be reliably prevented.

BRIEF DESCRIPTION OF THE DRAWINGS

Further advantages, features, and possible applications of the present invention will become apparent from the following description in conjunction with the figures. In the figures.

DETAILED DESCRIPTION OF VARIOUS EMBODIMENTS

Figure 1:
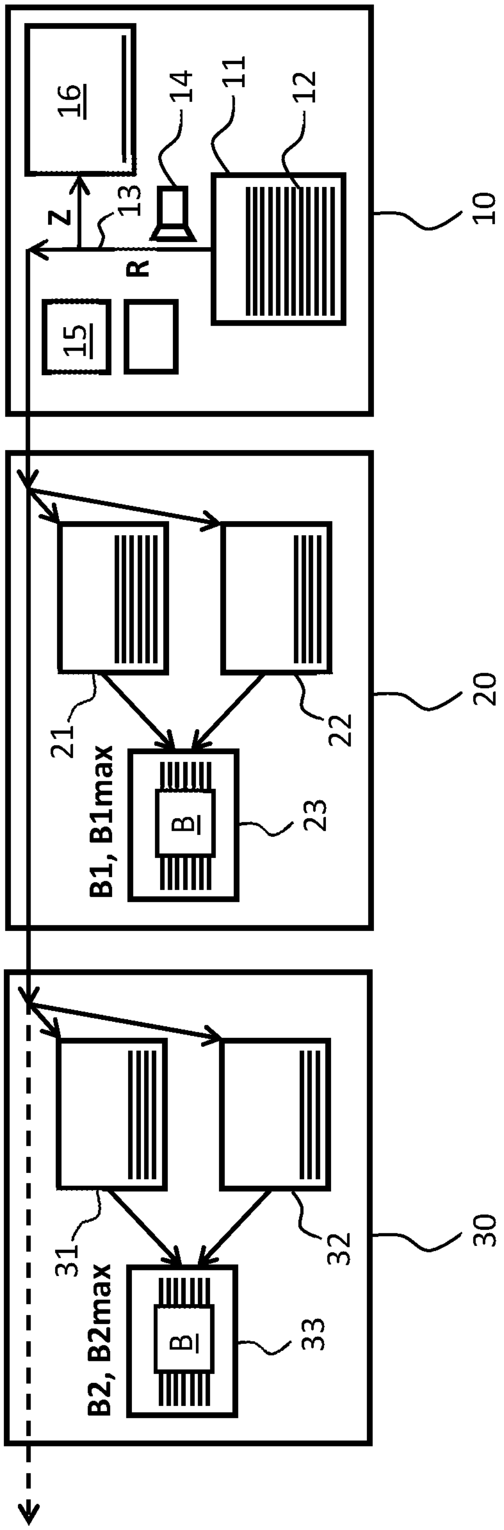
FIG. 1 shows an example of a system for processing documents of value.

FIG. 1 shows a schematic illustration of an example of a system for processing documents of value, which will be explained in more detail below with reference to the processing of banknotes.

In the present example, the system has a base module 10, a first module 20, and a second module 30. The base module 10 has a so-called separator 11 which is designed to remove the banknotes input in the form of a stack 12 one-by-one from the stack 12 and to feed them to a transport path 13.

During their transport, the banknotes pass one or more sensors 14, which detect one or more—for example, optical, acoustic, and/or magnetic—properties of the banknotes and convert them into corresponding sensor signals. The sensor signals are evaluated in a control device 15 and used to check and/or classify and/or identify the banknotes.

As a function of the result of the check or classification, the banknotes are sorted by being fed to different output compartments 16, 21, 22, 31, 32. In the present example, the system has a so-called reject compartment 16 into which banknotes are output that could not or could not reliably be checked, classified, or identified due to dog-ears, soiling, and/or tears, for example, and have to be re-processed—in particular, manually. Furthermore, the first module 20 has two stacker compartments 21 and 22 into which banknotes are output and stacked that belong to a class assigned to the first module 20 or fulfill or do not fulfill a specific sorting criterion. In the present example, the second module 30 also has two stacker compartments 31 and 32 into which banknotes are output and stacked that belong to a class assigned to the second module 30 or fulfill or do not fulfill a sorting criterion.

The first and second modules 20 or 30 further each have a banding device 23 or 33, which is designed to provide the stacks of banknotes formed in the stacker compartments 21 and 22 or 31 and 32 with in each case a band B. The modules 20, 30 are preferably configured in such a way that only stacks with a specific, and preferably specifiable, number of banknotes, e.g., 100, are provided with a band B.

In the present example, the two stacker compartments 21 and 22 or 31 and 32 of the respective module 20 or 30 are each assigned a bander 23 or 33. The bander 23 or 33 is therefore also referred to as a shared bander, and the two stacker compartments 21 and 22 or 31 and 32 are referred to as a tandem stacker. The tandem stackers 21, 22 or 31, 32 in the first and second modules 20 or 30 have an effect similar to that of a high-pass filter in electronic signal or image processing: as long as the time required to reach the specified number, e.g., 100, of banknotes in the respective stacker compartment 21, 22 or 31, 32 is not shorter than the time required by the respective bander 23 or 33 (so-called cycle time) for banding a stack, further banknotes can be accepted by the stacker compartments 21, 22 or 31, 32. If, on the other hand, so many banknotes are output into one of the modules 20, 30 that the time required in each case to reach the specified number of banknotes in the stacker compartments is shorter than the cycle time of the respective bander 23 or 33, no further banknotes can be accepted into the relevant module 20, 30 after a certain point in time.

Alternatively, it is possible to provide a separate bander (not illustrated) for each of the stacker compartments 21 and 22 or 31 and 32, or to provide only one stacker compartment 21 or 22, or 31 or 32 and one bander 23 or 33 per module 20, 30.

Depending upon the design and/or intended use of the system, one or more further modules can be provided in addition to the two modules 20 and 30 shown by way of example, as indicated by the dashed arrow.

The base module 10 is designed to process the individual banknotes of the stack 12 at a specifiable or adjustable processing rate R (banknotes per minute), i.e., in particular to separate, convey, and check said banknotes, and to feed them to one of the two modules 20, 30 or to the reject compartment 16. The banknotes fed to the modules 20, 30 in each case are banded there at a banding rate B1 or B2 (banknotes per minute). Taking into account the reject rate Z of the banknotes fed into reject compartment 16 per unit time, the following continuity equation applies: $R=B1+B2+Z$.

The maximum number of banknotes that can be banded in a module 20, 30 or by the relevant bander 23 or 33 per unit time is determined by technical factors or by the design of the relevant module 20, 30 and/or bander 23 or 33, and is characterized in each case by a maximum banding rate B1max or B2max (banknotes per minute).

According to a particularly preferred aspect of the present disclosure, the specified processing rate R of the banknotes in the base module 10 is greater than the maximum banding rates B1max and B2max of the modules 20, 30. The processing rate R is in this case preferably determined or specified taking into account the maximum banding rates B1max, B2max and an expected or assumed statistical distribution of the banknotes among the two modules 20, 30 based upon at least one sorting criterion. The expected or assumed statistical distribution is preferably characterized by at least one frequency parameter.

Optionally, a measure of the reliability of the assumed statistical distribution—in particular, in the form of a confidence parameter and/or confidence interval—can additionally be taken into account.

Optionally, measures can also be provided by means of which deviations from the assumed statistical distribution of the banknotes among the modules 20, 30 can be reacted to during the sorting of the banknotes of a batch currently being processed, in order to ensure continuous operation during the processing of the banknotes.

The aforementioned aspects are explained in more detail below with reference to application examples.

Figure 2:
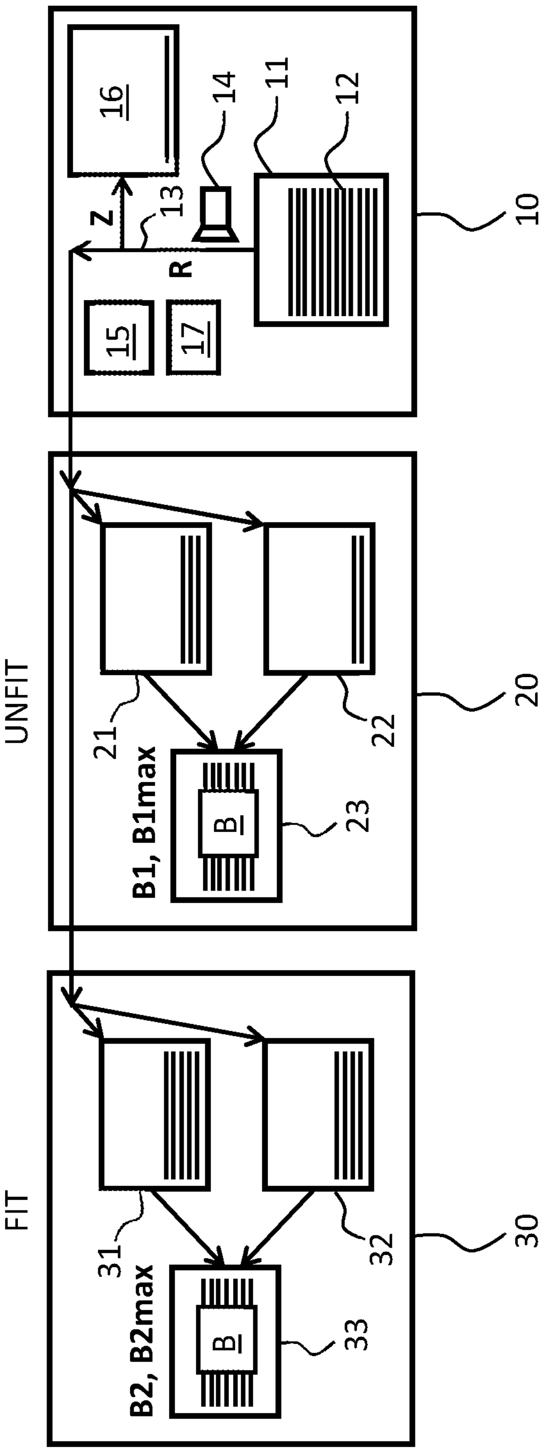
FIG. 2 shows a first application example of a system during the processing of documents of value.

FIG. 2 shows a first application example of a system for processing documents of value. With regard to the structure and mode of operation of the system, the above explanations apply correspondingly in connection with the example shown in FIG. 1.

For this and the application examples described below, it is assumed that banknotes can be processed in the base module 10 at a processing rate R of up to 2,000 banknotes per minute. It is further assumed that the banders 23, 33 each require a cycle time of 6 seconds for banding a stack, which corresponds to 10 stacks per minute. If the number of banknotes provided in each bundle is 100, for example, the maximum banding rate B1max, B2max of the banders 23, 33 thus corresponds to 10 stacks/minute×100 banknotes/stack=1,000 banknotes/minute.

In the present application example, a batch of banknotes is to be checked for fitness (sorting criterion) and, having been sorted accordingly, fed to the two modules 20, 30. In the present example, the banknotes classified as "unfit" are fed to the first module 20, and the banknotes classified as "fit" are fed to the second module 30. On the basis of empirical values and/or data obtained from the processing of banknote batches in the past, a statistical distribution of banknotes classified as "fit" or "unfit" of 70% (h1=0.7) or 30% (h2=0.3) is assumed in this application example.

Taking into account the maximum banding rates B1max, B2max and the expected statistical distribution or the corresponding frequency parameters h1, h2, a processing rate R can now be determined or specified in such a way that, on the one hand, the highest possible overall throughput of the processed banknotes is achieved, and, on the other, continuous operation during the processing of the banknotes is not jeopardized by reaching the maximum banding rates B1max, B2max.

In this example, a processing rate R of 1,200 banknotes/minute is specified, on the basis of which, taking into account the expected statistical distribution, around 360 banknotes/minute must be output and banded in the first module 20, and around 840 banknotes/minute in the second module 30. Optionally, in this case a rejection rate Z of, for example, 36 banknotes/minute (corresponding to 3% of the processing rate R) can also be taken into account, such that around 349 banknotes/minute must be output and banded in the first module 20, and around 815 banknotes/minute in the second module. The banding rates required in each case—in particular, also for the second module 30, into which 70% of the banknotes are output—are thus within a sufficient safety margin of the maximum banding rate B1max or B2max of 1,000 banknotes/minute, such that, even in the event of a deviation from the assumed statistical distribution within certain limits, the respective maximum banding rate B1max, B2max is not reached or exceeded.

If the currently processed batch has a statistical distribution that deviates from the assumed distribution of 70% to 30% ("fit" to "unfit"), e.g., 75% to 25%, then (optionally taking into account a rejection rate Z of 36 banknotes/minute) 300 (291) banknotes/minute are output in the first module, and 900 (873) banknotes/minute are output in the second module, and banded at a corresponding banding rate which is still lower than the respective maximum banding rate B1max or B2max of 1,000 banknotes/minute.

Relative to the maximum banding rates B1max, B2max of 1,000 banknotes/minute, the specified processing rate R of 1,200 banknotes/minute is therefore 20% higher. Despite the limitation of the processing operation due to the given maximum banding rates, a 20% higher overall throughput is thus achieved in the processing of the banknotes.

Preferably, a user interface 17 is provided by means of which an operator can change, and in particular increase or decrease, the originally specified processing rate R. In the simplest case, two keys (e.g., "speed up" and "speed down") can be provided for this purpose, for example. As a result, the processing rate R can be further optimized in order, on the one hand, to achieve the highest possible overall throughput and, on the other, to maintain continuous processing of the banknotes.

Alternatively or additionally, the control device 15 can be designed to feed banknotes processed in the base module 10—instead of the modules 20, 30—to the reject compartment 16 or another stacker compartment (not illustrated) if, in at least one of the modules 20, 30, the currently required banding rate B1, B2 is in danger of reaching (i.e., is approaching), reaches, or exceeds the respective maximum banding rate B1max or B2max.

Alternatively or additionally, however, instead of such a "redirection" of processed banknotes, the speed at which the banknotes are processed in the base module 10 can also be reduced—by means of the control device 15 and/or corresponding input via the user interface 17—for example, by at least temporarily reducing the transport speed at which the banknotes are conveyed during processing in the base module 10. In the extreme case, it can also be provided that the processing of the banknotes in the base module 10 be at least temporarily stopped.

Figure 3:
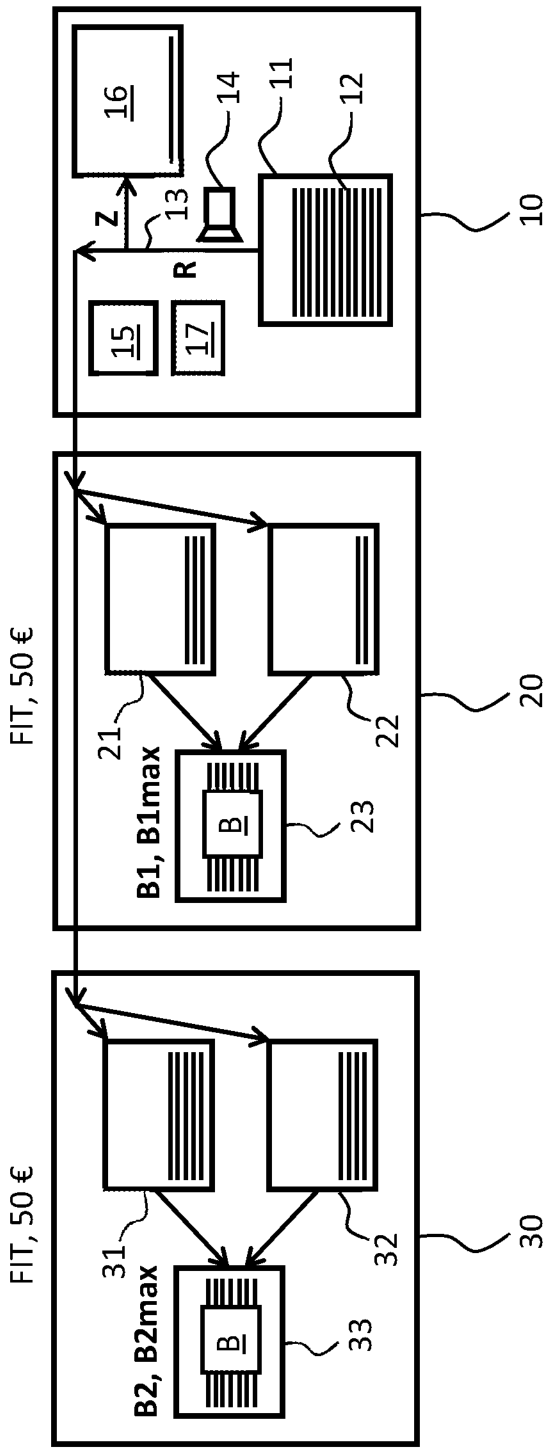
FIG. 3 shows a second application example of a system during the processing of documents of value.

FIG. 3 shows a second application example of a system during the processing of documents of value. With regard to the structure and mode of operation of the system, the above explanations apply correspondingly in connection with the examples shown in FIGS. 1 and 2.

In this application example, a batch of €50 banknotes considered to be "fit" (i.e., only one denomination is included in the batch) is processed. Such an application case can arise, for example, when a cassette located in an ATM and at least partially filled with banknotes (so-called ATM cassette) is removed from the ATM and returned to a central office—for example, a so-called cash center.

In the present example, the processed banknotes are not sorted in the narrower sense, i.e., according to a sorting criterion such as fitness or denomination, but the banknotes processed, e.g., sensed, counted, and/or identified by their serial numbers, are distributed in equal proportions among the two modules 20, 30, which are used in a kind of "tandem operation." The statistical distribution of the banknotes among the two modules 20, 30 which is assumed or specified in this case is therefore 50% in each case (h1=h2=0.5).

As in the first application example described above, a processing rate R can also be determined or specified in the present case, taking into account the maximum banding rates B1max, B2max and the assumed or specified statistical distribution or the corresponding frequency parameters h1, h2, in such a way that, on the one hand, the highest possible overall throughput of the processed banknotes is achieved, and, on the other, continuous operation during the processing of the banknotes is not jeopardized by reaching or exceeding maximum banding rates in the modules 20, 30.

In the present example, a processing rate R of 1,600 banknotes/minute is specified, on the basis of which, taking into account the assumed or specified statistical distribution, 800 banknotes/minute must be output and banded in each of the first and second modules 20, 30. Optionally, a rejection rate Z of, for example, 48 banknotes/minute (corresponding to 3% of the processing rate R) can also be taken into account, such that around 776 banknotes/minute must be output and banded in the first and second modules 20, 30. The banding rates required in each case are thus within a sufficient safety margin of the maximum banding rate B1max or B2max of 1,000 banknotes/minute. In this application, in which the distribution of the processed documents of value is fixedly specified, the safety margin from the respective maximum banding rate B1max or B2max can be correspondingly smaller than in applications in which the specified or assumed distribution of the processed documents of value is based upon empirical values, estimates, or previous evaluations.

Relative to the maximum banding rates B1max, B2max of 1,000 banknotes/minute, the processing rate R of 1,600 banknotes/minute specified in the present application example is thus 60% higher. Despite the limitation of the processing operation due to the given maximum banding rates, a 60% higher overall throughput is thus achieved in the processing of the banknotes.

As in the first application example, it can also be provided in this application example that an operator be able to change, and in particular increase or decrease, the originally specified processing rate R by means of a corresponding input via a user interface 17. In the simplest case, two keys (e.g., "speed up" and "speed down") can be provided for this purpose, for example. As a result, the processing rate R can be further optimized in order, on the one hand, to achieve the highest possible overall throughput and, on the other, to maintain continuous processing of the banknotes. The control device 15 can also be designed to feed banknotes processed in the base module 10—instead of the modules 20, 30—to the reject compartment 16 or another stacker compartment (not illustrated) if, in at least one of the modules 20, 30, the currently required banding rate B1, B2 is in danger of reaching (i.e., is approaching), reaches, or exceeds the respective maximum banding rate B1max or B2max. Instead of such a "redirection" of processed banknotes, the speed at which the banknotes are processed in the base module 10 can also be reduced—by means of the control device 15 and/or corresponding input via the user interface 17—for example, by at least temporarily reducing the transport speed at which the banknotes are conveyed during processing in the base module 10. In the extreme case, it can also be provided that the processing of the banknotes in the base module 10 be at least temporarily stopped.

Figure 4:
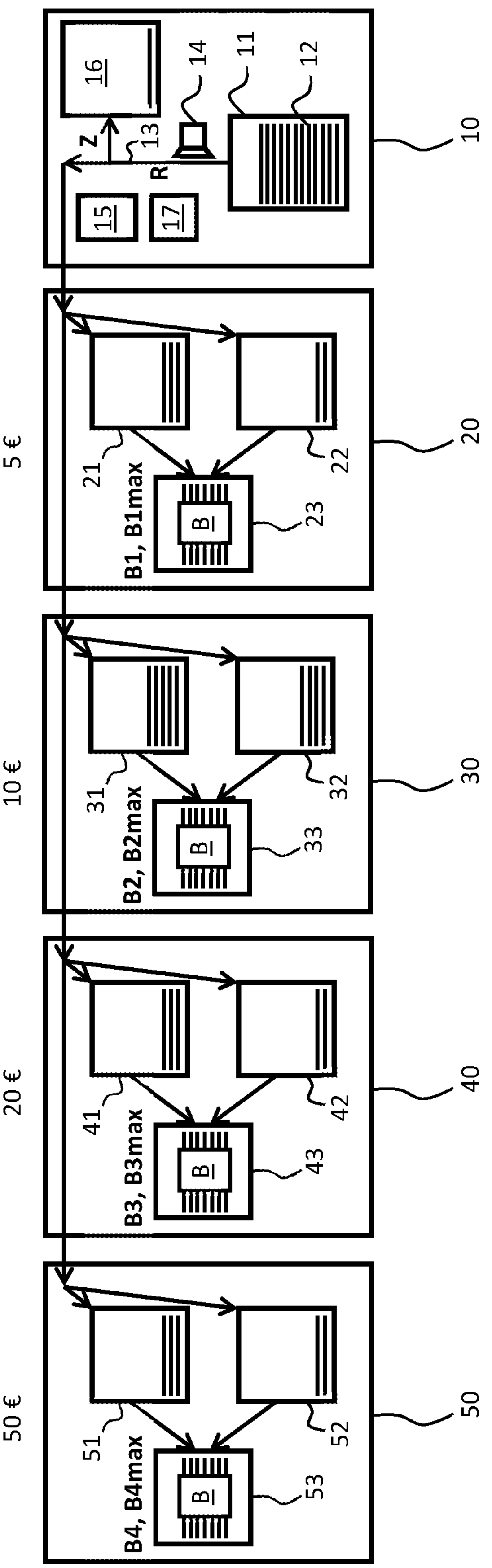
FIG. 4 shows a third application example of a system during the processing of documents of value.

FIG. 4 shows a third application example of a system during the processing of documents of value. With regard to the structure and mode of operation of the system, the above explanations apply correspondingly in connection with the examples shown in FIGS. 1 through 3.

In this application example, a batch of banknotes with four different denominations is processed, viz., €5, €10, €20, and €50 banknotes. Accordingly, in addition to a first and second module 20 or 30, the system has a third and fourth module 40 or 50, which is identical or at least substantially identical to the first and second modules 20, 30 in terms of structure and mode of operation.

On the basis of empirical values and/or data obtained during the processing of banknote batches in the past, a statistical distribution of the banknotes contained in the batch to be processed is assumed in the present application example as follows: 20% (€5), 20% (€10), 30% (€20), and 30% (€50). The corresponding statistical frequency (frequency parameter) is thus h1=h2=0.2 for €5 and €10 banknotes, or h3=h4=0.3 for €20 and €50 banknotes.

In the present example, a processing rate R of 2,000 banknotes/minute is specified, which corresponds to the maximum achievable processing rate of the base module 10.

Taking into account the expected statistical distribution (and optionally a rejection rate Z of, for example, 60 banknotes/minute, corresponding to 3% of the processing rate R), the number of banknotes/minute indicated below is output to modules 20, 30, 40, and 50 and banded there: 400 (388) banknotes/minute in each of the first and second modules 20, 30, and 600 (582) banknotes/minute in each of the third and fourth modules 40.

The banding rates required in each case are thus significantly below the respective maximum banding rate B1max, B2max, B3max, or B4max of 1,000 banknotes/minute in each case for all banders 23, 33, 43, and 53. This ensures that, even if the statistical distribution occurring during the processing of a batch deviates to a comparatively large extent from the assumed distribution, the respective maximum banding rate B1max, B2max, B3max, or B4max is not reached or exceeded. Relative to the respective maximum banding rate of 1,000 banknotes/minute in each of the modules 20, 30, 40, and 50, an increase in throughput of 100% is thus achieved by processing documents of value at a specified rate R of 2,000 banknotes/minute. Overall, therefore, on the one hand a high overall throughput of processed banknotes is achieved and, on the other, continuous operation during the processing of the banknotes is reliably ensured.

As in the first and/or second application example described above, it can also be provided in the present application example that an operator be able to change the originally specified processing rate R by means of a corresponding input via a user interface 17. Starting from the originally specified maximum possible processing rate R of 2,000 banknotes/minute, in this example, initially, only a reduction in the processing rate R, e.g., to 1,900 or 1,800 banknotes/minute, can be considered. As the processing progresses, it may be necessary or advantageous to increase the processing rate R to some extent again by means of a corresponding user input—for example, to 1,950 or 2,000 banknotes/minute. As a result, the processing rate R can be further optimized in order, on the one hand, to achieve the highest possible overall throughput and, on the other, to maintain continuous processing of the banknotes. The control device 15 can also be designed to feed banknotes processed in the base module 10—instead of the modules 20, 30, 40, and 50—to the reject compartment 16 or another stacker compartment (not illustrated) if, in at least one of the modules 20, 30, 40, and 50, the respective, currently required banding rate B1 through B4 is in danger of reaching (i.e., approaches), reaches, or exceeds the respective maximum banding rate B1max, B2max, B3max, or B4max. Instead of such a "redirection" of processed banknotes, the speed at which the banknotes are processed in the base module 10 can also be reduced—by means of the control device 15 and/or corresponding input via the user interface 17—for example, by at least temporarily reducing the transport speed at which the banknotes are conveyed during processing in the base module 10. In the extreme case, it can also be provided that the processing of the banknotes in the base module 10 be at least temporarily stopped.

The invention claimed is:

1. A system for processing documents of value, comprising:

one processing device which is designed to process, to separate, to convey, and/or to check, documents of value at a specifiable processing rate and to feed said documents of value to in each case one of at least two banding devices, at least two banding devices which are designed to provide at least one stack, which is formed by the documents of value respectively fed to a banding device, with a band, wherein the at least two banding devices are each characterized by a maximum banding rate which specifies the maximum number of documents of value that can be banded in the respective banding device per unit time, and a control device for specifying the processing rate based upon i) the maximum banding rates of the at least two banding devices and ii) at least one frequency parameter which characterizes a statistical frequency which is to be expected or assumed and with which the documents of value processed by the processing device are distributed among the at least two banding devices.

2. The system according to claim 1, wherein the control device is designed to specify the processing rate, which is greater than the maximum banding rate of at least one of the banding devices.

3. The system according to claim 1, wherein the control device is additionally designed to specify the processing rate based upon at least one confidence parameter by means of which an accuracy or reliability of the expected statistical frequency with which the documents of value are distributed among the banding devices is characterized.

4. The system according to claim 1, wherein the control device is designed to specify the processing rate which is smaller than at least one upper processing rate which in each case corresponds to the quotient obtained from the maximum banding rate of one of the banding devices and the frequency parameter which characterizes the statistical frequency with which the documents of value are distributed to this banding device.

5. The system according to claim 3, wherein the control device is designed to specify the processing rate which is at most as large as at least one reduced processing rate which corresponds to the upper processing rate which is reduced based upon the at least one confidence parameter.

6. The system according to claim 1, having a user interface designed to enable a user to specify the at least one sorting criterion and/or the at least one frequency parameter and/or the at least one confidence parameter.

7. The system according to claim 1, having a user interface designed to enable a user to change the processing rate specified by the control device.

8. The system according to claim 1, having at least one storage device in which the maximum banding rates by which the banding devices are characterized are stored.

9. The system according to claim 1, wherein the control device is designed to detect and/or determine at least one current banding rate characterizing the number of documents of value banded in at least one of the banding devices per unit time, and to control the system and/or the processing of the documents of value as a function of a deviation of the current banding rate of the relevant banding device from the maximum banding rate of this banding device.

10. The system according to claim 9, wherein the control device is designed, in the event that the deviation of the current banding rate of the relevant banding device from the maximum banding rate of this banding device falls below a specified deviation value and/or decreases over time, to control the system in such a way that documents of value which are to be fed to the relevant banding device are instead fed to a stacker device; or to stop the processing of the documents of value, at least temporarily; or to specify a processing rate which is reduced compared to the currently specified processing rate; or to specify a transport speed which is reduced compared to a current transport speed at which the documents of value are conveyed during the current processing.

11. A method for processing documents of value, comprising:

documents of value are processed, separated, conveyed, and/or checked, in one processing device at a specifiable processing rate and are fed in each case to one of at least two banding devices, and the documents of value fed to the at least two banding devices each form at least one stack which is provided with a band, wherein the at least two banding devices are each characterized by a maximum banding rate which specifies the maximum number of documents of value which can be banded in the respective banding device per unit time, wherein the processing rate is specified based upon i) the maximum banding rates of the at least two banding devices and ii) at least one frequency parameter which characterizes a statistical frequency which is to be expected or assumed and at which the documents of value processed by the processing device are distributed among the at least two banding devices.

12. A computer program product comprising instructions which, when the program is executed by a computer, cause the computer to execute the method according to claim 11.

13. A computer-readable storage medium comprising instructions which, when executed by a computer, cause the computer to execute the method according to claim 11.

14. The system according to claim 1, wherein the processing device is designed to feed said documents of value, based upon at least one sorting criterion, to in each case one of at least two banding devices.

15. The system according to claim 10, wherein the documents of value which are to be fed to the relevant banding device are instead fed to a stacker device based upon at least one sorting criterion and/or a specified distribution.

16. The method according to claim 11, wherein the documents of value are fed in each case to one of at least two banding devices based upon at least one sorting criterion.

* * * * *